Sept. 7, 1954  G. C. NEWELL  2,688,338
FLUID REGULATING DEVICE
Filed May 15, 1951

George C. Newell
INVENTOR.

BY *James M. Clark*

HIS PATENT ATTORNEY.

Patented Sept. 7, 1954

2,688,338

UNITED STATES PATENT OFFICE 2,688,338

FLUID REGULATING DEVICE

George C. Newell, Seattle, Wash., assignor to Boeing Airplane Company, a corporation of Delaware Application May 15, 1951, Serial No. 226,456

10 Claims. (Cl. 137—494)

The present invention relates generally to pressure controls and more particularly to an improved fluid pressure regulating valve for use in hydraulic systems utilizing both high and low pressures.

In fluid systems, it is frequently desirable to provide high pressure lines from the pressure supply source to a point as close as practicable to the fluid-actuated device in order to save weight of the fluid and the piping; to prevent too great a pressure drop under flow conditions; and to operate the device at a lower pressure. This is particularly advantageous in hydraulic brake systems for use in aircraft in which the high pressure line extends from the pressure supply system in the fuselage down to a so-called "deboost" or pressure-reducing valve which may be located upon the landing gear strut relatively close to the expander tubes of the wheel brake units.

The improved "deboost" or regulator valve of the present invention comprises essentially a casing having two cylindrical bores of different sizes in which an area-multiplying spring opposed piston is arranged to reciprocate and divide the casing into high and low pressure chambers. A ball check valve is carried by the piston and a pintle or pin is slidably mounted in the base of the cylinder normally overcoming the opposition of a suitable spring which permits it to extend to its operating position just short of unseating the ball of the check valve. Under certain conditions, however, such as when there is a slow leak or loss of fluid in the low pressure side of the system the piston will advance to a position beyond its normal position in which the pin unseats the ball to provide the required amount of make-up fluid. The cooperative relationship of the spring-biased pin and the ball check valve carried by the piston is also such that when an excessive leakage occurs in the low pressure side of the system the spring biasing the pin overcomes the lowered pressure and the pin is moved into a retracted position in which the ball cannot be unseated to thereby prevent loss of fluid from the high pressure side of the system.

It is a primary object of the present invention to provide an improved hydraulic system utilizing high and low pressure portions with an improved "deboost" or pressure regulating valve between the two portions of the system. It is a further object to provide an improved pressure reducing valve in a hydraulic brake system in the region of the brake unit remote from the pressure supply source in order to save weight and pressure drop under flow conditions. A further object of the present invention resides in providing an improved regulating valve of simplified, low cost construction and which is positive and accurate in its operation. A further object resides in providing such a regulating device in which a ball check valve is carried by the piston and a spring biased unseating pin is slidably carried within the casing for automatically providing make-up fluid to the low pressure side of the system. It is a further object to provide such an arrangement wherein excessive leakage and loss of pressure on the low pressure side will prevent the transfer of fluid from the high pressure side of the system. It is a further object of this invention to provide an improved cooperative arrangement and relationship of the parts of a pressure regulating and transfer valve construction for use in a hydraulic brake system. Other objects and advantages of the present invention will occur to those skilled in the art after reading the following description, taken in conjunction with the accompanying drawings, forming a part hereof, in which:

Figure 1:
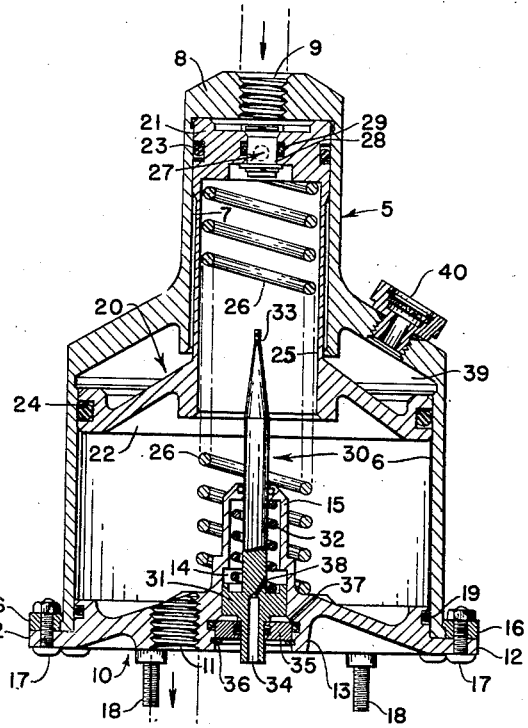
Fig. 1 is a cross-sectional view of a preferred form of the improved regulating device.

Referring now to Fig. 1, the numeral 5 represents the body or casing which consists of an enlarged low pressure end provided with a cylindrical bore 6 and the smaller high pressure closed end portion which is provided with the smaller cylindrical bore 7. The smaller or high pressure end of the casing 5 is enclosed by an integral high pressure head 8, the central portion of which is provided with a threaded opening 9 for attachment of the high pressure inlet pipe to the high pressure cylinder 7.

The enlarged and open end of the casing formed by the low pressure cylindrical bore 6 is closed by the low pressure casing head 10 which is provided with the threaded outlet or low pressure port 11 laterally spaced from the axial center of the casing head. A mounting flange 12 is provided at the periphery of the casing head 10 and its central portion is provided with an enlarged hub 13. Within this hub portion there is provided a cylindrical bore or chamber 14 and a casing 15 which extends inwardly into the large cylinder 6, the casing 15 being an integral portion of the cylinder head 10 and its hub portion 13. The periphery of the open end of the cylinder portion 6 of the casing 5 is provided with a lip which is engaged by the annular retaining ring 16 suitably apertured for the retaining bolts 17. A plurality of threaded mounting studs 18 is provided externally of the cylinder head 10 and the shouldered portion of its mounting flange is provided with an annular recess within which a sealing ring 19 is provided to prevent leakage of fluid from the low pressure cylinder 6, past the cylinder head 10.

The numeral 20 represents an area-increasing or double piston having a small diameter high pressure piston portion 21 reciprocable within the high pressure cylinder bore 7 and a large diameter low pressure piston portion 22 reciprocable within the low pressure cylinder 6. The high pressure portion 21 and the low pressure portion 22 are provided respectively with the seals 23 and 24 to prevent fluid leakage past the two piston portions. The high pressure portion 21 is provided with a central opening 25 within which is housed the compression spring 26 bearing against the inner face of the high pressure piston head 21 at its upper terminal and against the shoulder formed on the hub 13 of the cylinder head 10 at its lower terminal, tending to separate the piston and the cylinder head or to urge the piston upwardly against the high pressure cylinder head 8. The compression spring 26 is designed such that when the high pressure fluid enters the inlet port 9 the piston 20 moves downwardly overcoming the spring 26 to an extent at which a predetermined low pressure is developed within the cylinder 6 and the line connected to the outlet port 11 to the expander tube of the wheel brakes. Under normal operating conditions with the brakes applied the high pressure may preferably be about 3000 p. s. i., the low or brake actuating pressure about 450 p. s. i., and the piston will assume a balanced position of equilibrium adjacent but spaced from the lower end of the casing.

Figure 2:
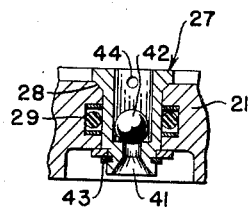
Fig. 2 is an enlarged cross-sectional view of the ball check valve carried by the piston head of the device shown in Fig. 1.

Referring now to Fig. 2, the ball check valve carried in the center of the small piston head 21 on the axial centerline comprises the tubular valve unit 27 which fits within the opening 28 in the piston head against which it is made pressure-tight by the hydraulic O-ring seal 29. The valve body is provided with a metering orifice 41 against the upper end of which is normally seated the ball 42, and the lower mouth of the orifice is flared conically to receive the terminal 33 of the metering pin 30. The tubular body of the valve unit 27 is retained within the high pressure piston head 21 by means of the annular retaining washers 43, and a diametrically disposed pin 44, extending between the walls of the valve body, prevents loss of the ball 42 upwardly from within the valve unit.

Referring again to Fig. 1, the plunger or pin assembly 30 includes an integral piston portion 31 slidably mounted within the small cylindrical chamber 14 and spring biased downwardly into its seated or retracted position by the compression spring 32 housed within the casing portion 15. The inner terminal of the pin or plunger 30 is tapered and terminates in the cylindrical tip portion 33 which both serves to meter the fluid through the conical opening 41 in the ball check valve 27 as well as to engage the ball 42 and displace the same from the check valve seat. The opposite terminal of the pin or pintle is provided with a central orifice 34 within its lower reduced diameter stem or spindle portion which is slidable within the guide disc 35 held in place by the retaining ring 36 against which disc the spindle is suitably sealed, and the inner end of the axial opening 34 is connected by means of the vent or passageway 38 with the interior of the chamber 14, to vent the same and maintain this chamber as well as the interior of the casing 15 at atmospheric pressure at all times. A passageway 37 extends through the hub portion 13 of the casing head 10 providing communication between the low breaking pressure fluid within the chamber 6 and the portion of the chamber 14 beneath the piston 31 carried by the pin assembly 30. Accordingly while the pin assembly 30 is biased by the spring 32 into its seated position in which its piston 31 bears against the disc 35, the pin assembly is also pressure biased or urged upwardly against the opposition of the compression spring 32 by the hydraulic pressure developed within the low pressure chamber 6 as transmitted through the passageway 37 to the bottom of the cylinder 14 beneath the piston 31. A breather and filtered vent fitting 40 is provided through the tapered wall of the casing 5 between the pistons 21 and 22 to maintain the space 39 at atmospheric pressure.

The operation of the device disclosed in Figs. 1 and 2 will be described in connection with a preferred form of the invention as applied to the brakes of an aircraft wheel, or similar device. It will be understood that a hydraulic pressure from a suitable high pressure source, which may be of the magnitude of 3000 p. s. i., will be connected to the high pressure inlet port 9 of the valve casing 8. A suitable main brake metering valve, preferably operated by a foot of the pilot or other operator, will be interposed in the high pressure line and the brake valve, which may be of the conventional type, will be provided with a return line to the source of supply of the hydraulic fluid for the return of the fluid after the pressure on the wheel brake has been released. The regulating device 5 is preferably located on the landing gear structure as close to the wheel brake units as is conveniently possible, and as indicated above, the function of the device is to reduce the pressure applied to the expander tubes of the wheel brake units and to close off the high pressure fluid in the event of an expander tube failure or rupture.

When the brake pedal is depressed, the brake pressure fluid metered by the brake metering valve actuated by the pedal enters the top port 9 of the regulating valve 5 and acts on the small end 21 of the piston 20, forcing it down against the opposition of the compression spring 26 and the large end 22 gradually develops the expander tube pressure. The big piston 22 has approximately 6.7 times the area of the small piston 21, in the form of the valve shown in Fig. 1, thereby giving a 6.7:1 ratio of pressure reduction required for a given set of expander tubes. Accordingly, with an initial high pressure in the order of 3000 p. s. i. applied to the small diameter piston 21 which forces the piston assembly 20 downward to its normal operating position, in which the large diameter piston 22 approaches the cylinder head 10 and the spring 26 is considerably compressed, the pressure developed on the low pressure side of the piston assembly will be of the order of some 450 p. s. i., which is transmitted through the outlet port 11 to the expander tubes for the application of brakes to the landing wheel. As the brakes are thus applied the piston assembly 20 reaches a position at which the high pressure against the small piston 21 is balanced by the low pressure exerted against the large piston 22, together with the force developed by the compressed spring 26, or a condition of equilibrium is attained. Under this condition the low pressure fluid passing through the passageway 37 into the bottom of the chamber 14 imparts upward pressure or inward movement of the piston 31 of the pin assembly 30, tending to compress the spring 32 within the casing 15 causing the pin assembly 30 to also move into an operative position in which it does not quite make contact with the ball 42 in the check valve 27. When the operating conditions are normal and the normal pressures are maintained on both sides of the regulating device 5, the downward movement of the piston assembly 20 and its ball check valve 27 is arrested just short of meeting the upward movement of the terminal 33 of the pin assembly 30, which moves upwardly into the hollow piston to meet the downwardly moving smaller piston portion as the pressure is gradually increased within the low pressure chamber 6; but no contact is made between the end of the pin 33 and the ball 42 as long as the operating conditions and pressures remain normal. Accordingly, the ball check valve 27 remains closed and no transfer of fluid flows either through or around the piston assembly 20 as long as the predetermined pressure differential is developed and the operating conditions remain normal.

Following the application of the brakes, the springs in the expander tube units in the wheel brakes force the fluid from the tube units back into the regulating valve chamber 6 when the pressure is released from the brake pedal. The large compression spring 26 is sufficiently strong to return the piston assembly 20 to the top of its stroke against the hydraulic tank pressurization pressure which is present in the return line at any time the supply tank or reservoir is pressurized. It will be understood that as the pressure on the brake pedal is released the high pressure is cut-off from the port 9 of the regulating valve by the above mentioned conventional brake metering valve and the line from the port 9 is connected through the metering valve to its return port and into a return line back to the reservoir or tank in which the hydraulic fluid is stored. The spring 26 then forces the piston assembly 20 into its fully upward position, and the spring 32 reseats the pin assembly 30, as shown in Fig. 1 and the brake system is again conditioned and ready for the next application of the wheel brakes.

Let it now be assumed that some loss of fluid has occurred in the line 11 between the regulating valve and the brake unit due to a slow leak or expansion due to heated brakes, or for other reasons, and that there is insufficient hydraulic fluid in the low pressure side of the system to provide normal operation. As the brakes are again applied and the high pressure fluid enters the inlet port 9, the piston assembly 20 is forced downwardly to a position beyond and below the normal position described above, inasmuch as it is required to move further downwardly in order to develop the required pressure, to permit a state of equilibrium to be reached. As the pressure is developed within the low pressure chamber 6, the upper terminal of the pin 33 again moves upwardly into its normal position but as the piston assembly 20 moves downwardly past its normal position the end 33 of the pin enters the metering orifice 41 of the check valve unit 27 and displaces the ball 42 from its seat. This permits high pressure fluid to flow under metered conditions through the orifice in the ball check valve around the terminal 33 of the pin until sufficient fluid and pressure is supplied to the low pressure side of the piston 20 to again permit a state of equilibrium to be reached with the higher pressure being exerted upon the small piston 21. The piston assembly then again rises to its normal position at which the ball 42 is again permitted to seat and close off the flow through the check valve 27. This feature automatically allows replenishing of the fluid in the low pressure or expander tube side of the regulating valve and restores the piston assembly to its normal position at which the ball 42 is reseated and a condition of equilibrium is reached as the application of the brakes are continued. When the brakes are again released the device and the pressures are again restored as described above.

Let us now assume that a leak of sufficient magnitude has developed in the line 11 from the regulating valve 5 to the wheel brake unit and as the pressure is applied to the brake pedal and the piston is forced downwardly, insufficient fluid remains in the low pressure chamber 6 to operate the brake units. The piston assembly 20 is accordingly forced downwardly against the opposition of the spring 26 only, or assisted to a minor extent by the inadequate fluid pressure, and it reaches its maximum downward position below its normal position. At the same time, however, inasmuch as insufficient pressure is developed within the low pressure chamber 6 to force the piston 31 of the pin assembly 30 upwardly into its normal operating position, the terminal 33 of the pin falls short of contacting the ball 42 in the check valve and no flow is permitted through the "deboost" valve. This feature accordingly prevents any further loss of fluid and pressure within the system in the event of a line break, or of an expander tube failure, and since the "deboost" valve is designed such that a pressure of 100 p. s. i. or less in the large chamber 6 will cause the pin assembly 30 to remain retracted, the check valve cannot be opened and none of the fluid in the high pressure side of the system can be lost through the failure of the low pressure line or an expander tube within the brake units. After the cause of the leakage has been removed or the leak repaired, the low pressure portion of the system may be refilled from the high pressure side by pushing upward manually upon the exposed pin end 34 to unseat the ball 42 to permit sufficient fluid to enter the chamber 6 and the line to the brake units.

Figure 3:
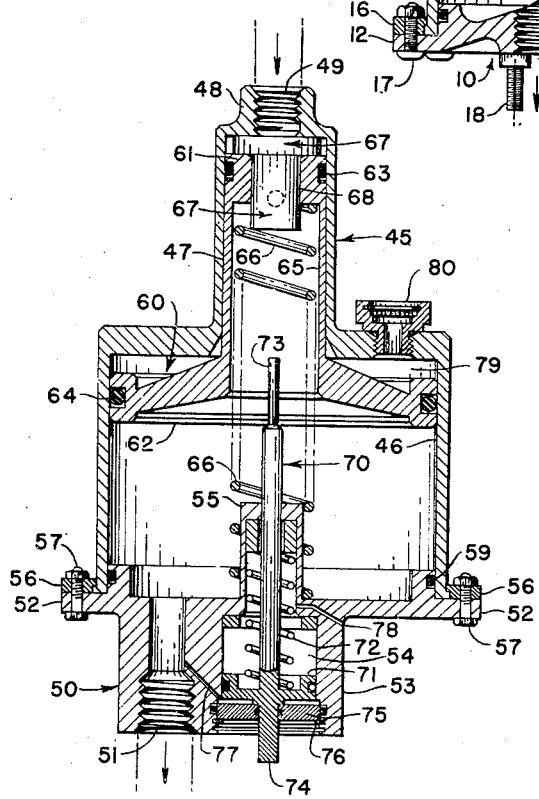
Fig. 3 is a cross-sectional view of a modified form of regulating device.
Figure 4:
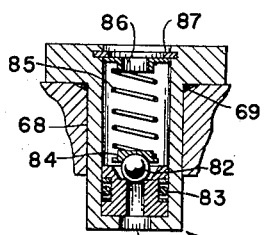
Fig. 4 is an enlarged sectional view of its modified form of ball check valve.

In the form of the regulating device shown in Figs. 3 and 4 the casing is indicated generally by the numeral 45, formed into the low and high pressure chambers 46 and 47, respectively, with the high pressure cylinder enclosed by the head portion 48 within which is provided the threaded inlet port 49 and with a casing head fitting 50 provided to close off the open low pressure end of the casing 45. The casing head 50 is provided with a threaded outlet port 51 for transmission of the brake actuating fluid at the lower pressure to the expander units of the wheel brakes, and the casing is provided with a flanged periphery 52, and a body portion 53 within which is formed the chamber 54 open to the interior of the hollow inwardly extending casing portion 55. An annular retaining ring 56 is suitably apertured to receive the attachment bolts 57 which pass through the mounting flange 52 of the casing head 50 and an O-ring seal is preferably provided at 59 to make the joint of the casing and its head member fluid-tight.

The double piston assembly is indicated by the numeral 60 being comprised of the high pressure piston portion 61 and the low pressure portion 62 provided respectively with the seal elements 63 and 64. The high pressure piston portion 61 is provided with an internal bore 65 arranged to house and receive the compression spring 66 which bears at its opposite terminal upon the casing head 50 where it embraces the inwardly extending head portion 55. A check valve unit 67 is suitably retained within the opening 68 in the piston head 61 against which it is made fluid-tight by the seal element 69. As in the previously described modification, the check valve unit 67 cooperates similarly with the pin assembly 70 slidably retained within the casing head 50 having an integral piston portion 71 urged into its seated position as shown in Fig. 3 by the compression spring 72. The pin assembly 70 preferably terminates in a reduced diameter terminal portion 73 at its upper end and a cylindrical portion 74 at its opposite terminal extending through the bore of the guide disc 75 suitably retained within the casing head portion 53 by the retaining element 76. An orifice or passageway 77 communicates with the outlet passage to the port 51 for transmitting low pressure fluid to the bottom of the chamber 54 beneath the piston 71 and the remaining portion of the chamber 54 and the space within the casing 55 above the piston 71 is vented externally to the atmosphere by the orifice or passageway 78. The variable volume air space 79 between the high and low pressure portions of the piston assembly 60 is similarly vented to the atmosphere by the combined filter and vent fitting 80 threadedly attached to the casing body 45.

As shown in Fig. 4 the check valve assembly 67 is provided with an annular orifice 81 arranged to be entered by the pin terminal 73 for unseating of the ball 82 which is urged into its closed position by the spring 85 mounted between the washers 84 and 86 retained by the element 87, the entire unit being sealed by the O-ring 83. The operation of the form of the regulating device shown in Figs. 3 and 4 is substantially identical with that previously described in conjunction with Figs. 1 and 2.

Other forms and modifications of the present invention which may occur to those skilled in the art after reading the foregoing description are intended to come within the scope and spirit of this invention as more particularly set forth in the appended claims.

I claim:

1. In a fluid pressure system, a regulating device comprising a casing, small and large diameter chambers formed within said casing, a high pressure port through said casing in communication with said small chamber, a low pressure port through said casing in communication with said large chamber, a double piston having small and large diameter portions operable within said small and large casing chambers respectively, resilient means biasing said piston toward said high pressure port, biased closed valve means carried by said piston for the control of flow through said piston from one said chamber to the other said chamber, said double piston attaining a normal position upon application of pressure against said small diameter portion when balanced by the lesser pressure against the larger diameter portion, and means including a second spring-biased piston movable under the influence of pressure within said large chamber initiated by reduction of fluid in said large chamber and concurrent movement of said double piston beyond said normal position for engaging and automatically opening said valve means for the passage of make-up fluid through said opened valve means from said small to said large chamber.

2. In a fluid pressure system, a pressure regulating device comprising a casing, small and large diameter chambers formed by said casing, a high pressure inlet port through said casing in communication with said small diameter chamber, a low pressure outlet port through said casing in communication with said large diameter chamber, a double piston having small and large diameter portions operable within said small and large diameter chambers respectively, resilient means tending to move said piston toward said small diameter high pressure chamber, biased closed valve means carried by said piston for the control of fluid flow through said piston from said small diameter chamber to said large diameter chamber, and means including a further spring-biased piston movably carried by said casing movable toward said valve means under the influence of fluid pressure within said large diameter chamber for engaging and automatically opening said valve means upon predetermined excessive movement of said double piston into said large diameter chamber initiated by loss of fluid in said large diameter chamber, opening of said valve means causing compensating flow through said opened valve means from said high pressure inlet port.

3. In a regulating device for a fluid pressure system including a casing, small and large diameter chambers formed within said casing, a high pressure port through said casing in communication with said small diameter chamber, a low pressure port through said casing in communication with said large diameter chamber, a double piston having small and large diameter portions operable within said small and large diameter casing chambers respectively, resilient means urging said piston toward said high pressure port, and biased closed valve means carried by said piston for the control of fluid flow through said piston from one said chamber to the other said chamber, application of pressure through said high pressure port causing movement of said double piston to a predetermined position and displacement of fluid at a lower pressure through said low pressure port, the improvement comprising a second spring-biased piston movably carried by said casing and movable under the influence of pressure within said large chamber into engagement with said valve means upon said piston moving beyond said predetermined position for automatically opening said valve means for the passage of make-up fluid through said opened valve and piston from said small to said large diameter chamber.

4. In a fluid device for effecting changes in the pressures transmitted thereby, a casing having small and large chamber portions, a piston having small and large portions reciprocable within the respective chamber portions, a biased closed valve carried by said piston disposed in an opening extending through said piston for the control of compensating fluid flow from one said chamber portion to the other said portion, and valve actuating means disposed within said large chamber portion slidably carried by said casing movable under the influence of pressure within said large chamber portion toward said valve upon actuation of said fluid device by the application of fluid pressure to said small chamber portion, said valve actuating means arranged to open said valve upon predetermined excessive travel of said piston into said large chamber portion for the supply of make-up fluid from said small chamber portion to said large chamber portion of said casing.

5. In a fluid pressure transmitting device for effecting changes in the effective pressures transmitted thereby including a casing having small and large diameter chamber portions, a double piston having small and large diameter portions reciprocable within the respective chamber portion, resilient means interposed between said double piston and said casing urging said piston toward said small diameter chamber portion, and a biased closed valve carried by said piston disposed within a passage extending through said piston portions for the control of fluid flow through said piston from said small to said large diameter chamber portion, the improvement of spring-biased valve actuating means disposed within said large diameter chamber portion slidably carried by said casing movable under the influence of fluid pressure within said large diameter chamber portion toward said valve upon actuation of said pressure transmitting device and increase in pressure in said large diameter chamber portion arranged to open said valve upon predetermined excessive travel of said double piston into said large diameter chamber portion for the supply of make-up fluid from said small to said large diameter chamber portion of said casing.

6. A debooster device comprising a casing having small and large diameter chambers formed therein, a piston assembly having small and large diameter portions operable within the respective chambers of said casing, a biased closed valve carried by said small diameter piston portion, a high pressure inlet through said casing to said small diameter chamber, a low pressure outlet through said casing to said large diameter chamber, resilient means urging said piston assembly into said small diameter chamber, and a spring-biased valve actuating element slidably carried by said casing in the path of said valve, said valve actuating element extendible against said spring-biasing into said large diameter chamber toward said valve upon the development of predetermined actuating pressures therein for engaging and opening said valve upon excessive piston travel due to reduction in fluid volume on the low pressure side of said piston assembly for providing make-up fluid from the high pressure side of said piston assembly.

7. A debooster device comprising a casing having small and large diameter chambers formed therein, a piston assembly having small and large diameter portions operable within the respective chambers of said casing, a biased closed valve carried by said small diameter piston portion, a high pressure inlet through said casing to said small diameter chamber, a low pressure outlet through said casing to said large diameter chamber, resilient means urging said piston assembly toward said small diameter chamber, a spring-biased valve actuating element slidably carried by said casing in the path of said valve, said valve actuating element extendible against said spring-biasing toward said piston-carried valve upon the development of predetermined actuating pressures within said large diameter chamber for engaging and opening said piston-carried valve upon excessive piston travel due to reduction in fluid volume on the low pressure side of said piston assembly for providing make-up fluid from the high pressure side of said piston assembly, said valve actuating element being retractable under the influence of said spring-biasing upon the pressure within said large diameter chamber falling below a predetermined amount for preventing the opening of said piston-carried valve despite predetermined excessive travel of said piston assembly to prevent further loss of fluid from said high pressure side to said low pressure side of said piston assembly.

8. In a fluid device for transmitting high-pressure small-volume fluid control forces by the displacement of a larger volume of fluid at a lower pressure, a casing having a high pressure chamber and a low pressure chamber formed therewithin, piston means having portions reciprocably engaging each said casing chamber, valve means carried by said piston means for control of fluid flow from either said chamber to the other, fluid-actuated means for engaging and opening said valve means, said valve means disposed with respect to said fluid-actuated means in axial alignment in such manner that actuation of said device under normal operating conditions at which a predetermined volume of fluid is contained within the low pressure side of said piston means imparts concurrent approaching movements of said piston means and of said fluid-actuated means and displacement of fluid from and development of increased pressure within said low pressure chamber without opening said valve means and actuation of said device under condition of partially reduced volume of fluid in said low pressure chamber below said predetermined volume imparts excessive movement to said piston means beyond said normal condition position and causes approach and engagement of said valve means by said fluid-actuated means initiated by increased pressure developed in said low pressure chamber for the contacting engagement and opening of said valve and compensating flow of fluid from said high pressure chamber to said low pressure chamber.

9. In a fluid device for transmitting high-pressure and small volumes by the displacement of a larger volume of fluid at a lower pressure, a casing having a high pressure chamber and a low pressure chamber formed therewithin, piston means having portions reciprocably engaging each said casing chamber, valve means carried by said piston means for control of fluid flow from either said chamber to the other, plunger means responsive to pressures within said low pressure chamber for engaging and opening said valve means, said valve means disposed with respect to said plunger means in axial alignment in such manner that actuation of said device by application of high pressure fluid under normal operating conditions at which a predetermined volume of fluid is contained within the low pressure side of said piston means imparts approaching movement of said piston means and said plunger means as a result of displacement of fluid from and development of increased pressure within said low pressure chamber, said approaching movement under normal conditions being insufficient to cause opening of said valve means and actuation of said device under conditions of partially reduced volume of fluid in said low pressure chamber below said predetermined volume but development of increased pressure in said low pressure chamber imparts excessive movement to said piston means beyond said normal condition position and causes approach and engagement of said valve means by said plunger means initiated by increased pressure developed in said low pressure chamber for the contacting engagement and opening of said valve means and compensating flow of fluid from said high pressure chamber to said low pressure chamber, said plunger means having a portion extending through said casing arranged for manual operation for the opening of said valve means.

10. In a fluid device for transmitting forces from small volumes of fluid at high pressure by the displacement of a larger volume of fluid at a lower pressure, a casing having a high pressure chamber and a low pressure chamber formed therewithin, piston means having portions reciprocably engaging each said casing chamber, valve means carried by said piston means for control of fluid flow from either said chamber to the other, fluid-actuated means responsive to pressures within said low pressure chamber for engaging and opening said valve means, resilient means associated with said fluid-actuated means for opposing said response to said pressures, said valve means disposed with respect to said fluid-actuated means in axial alignment in such manner that actuation of said device by application of high pressure fluid under normal operating conditions at which a predetermined volume of fluid is contained within the low pressure side of said piston means imparts approaching movement of said piston means and said fluid-actuated means without the opening of said valve means, actuation of said device under conditions of partially reduced volume of fluid in said low pressure chamber below said predetermined volume but development of normal pressure in said low pressure chamber imparts excessive movement to said piston means beyond said normal condition position and causes approach and approaching engagement of said valve means by said fluid-actuated means initiated by increased pressure developed in said low pressure chamber for the contacting engagement and opening of said valve and compensating flow of make-up fluid from said high pressure chamber to said low pressure chamber, and actuation of said device under emergency conditions of reduced volume below the said predetermined volume of said normal operating conditions and reduced pressure in said low pressure chamber while imparting full movement to said piston means permits said resilient means to prevent approaching movement of said fluid-actuated means for maintaining said valve means in closed condition to prevent loss of fluid from said high pressure chamber.

References Cited in the file of this patent

UNITED STATES PATENTS

| Number | Name | Date |
|---|---|---|
| 1,563,847 | Hall | Dec. 1, 1925 |
| 1,703,531 | Hyde | Feb. 26, 1929 |
| 2,231,059 | Douglass | Feb. 11, 1941 |
| 2,345,811 | Harp | Apr. 4, 1944 |
| 2,428,150 | Field | Sept. 30, 1947 |
| 2,478,210 | Sprague | Aug. 9, 1949 |